United States Patent [19]

Menzel

[11] Patent Number: 4,546,834
[45] Date of Patent: Oct. 15, 1985

[54] MECHANICAL QUILL HAVING SELECTIVE BRAKING CAPABILITY

[75] Inventor: Klaus R. Menzel, Orchard Lake, Mich.

[73] Assignee: The Cross Company, Fraser, Mich.

[21] Appl. No.: 523,911

[22] Filed: Sep. 30, 1983

Related U.S. Application Data

[63] Continuation of Ser. No. 174,302, Jul. 3, 1980, abandoned.

[51] Int. Cl.[4] .............................................. B23Q 5/40
[52] U.S. Cl. .................................... 173/146; 408/137; 192/85 A; 192/2
[58] Field of Search ....................... 173/146; 408/137; 192/2, 3.29, 3.33, 3.3, 85 A

[56] References Cited

U.S. PATENT DOCUMENTS

| | | | |
|---|---|---|---|
| 3,166,167 | 1/1965 | Kinsman | 192/85 A X |
| 3,885,635 | 5/1975 | Menzel | 408/137 X |
| 3,955,629 | 5/1976 | Turner | 173/146 X |
| 4,103,763 | 8/1978 | Glocloners et al. | 192/2 |
| 4,201,271 | 5/1980 | Evans | 408/137 X |
| 4,411,346 | 10/1983 | Witt | 192/85 A |

Primary Examiner—E. R. Kazenske
Assistant Examiner—Willmon Fridie, Jr.
Attorney, Agent, or Firm—K. A. Seaman; J. R. Benefiel; R. J. Eifler

[57] ABSTRACT

A mechanical quill having selective braking capability, achieved by a pneumatic cylinder (110) mounted to one motor (80) for selectively driving a braking member (120) into a braking material (104) coupled to a motor armature (84). This braking member (120) interrupts a clutch-type drive path through the motor as desired, to prevent advance of a quill.

2 Claims, 3 Drawing Figures

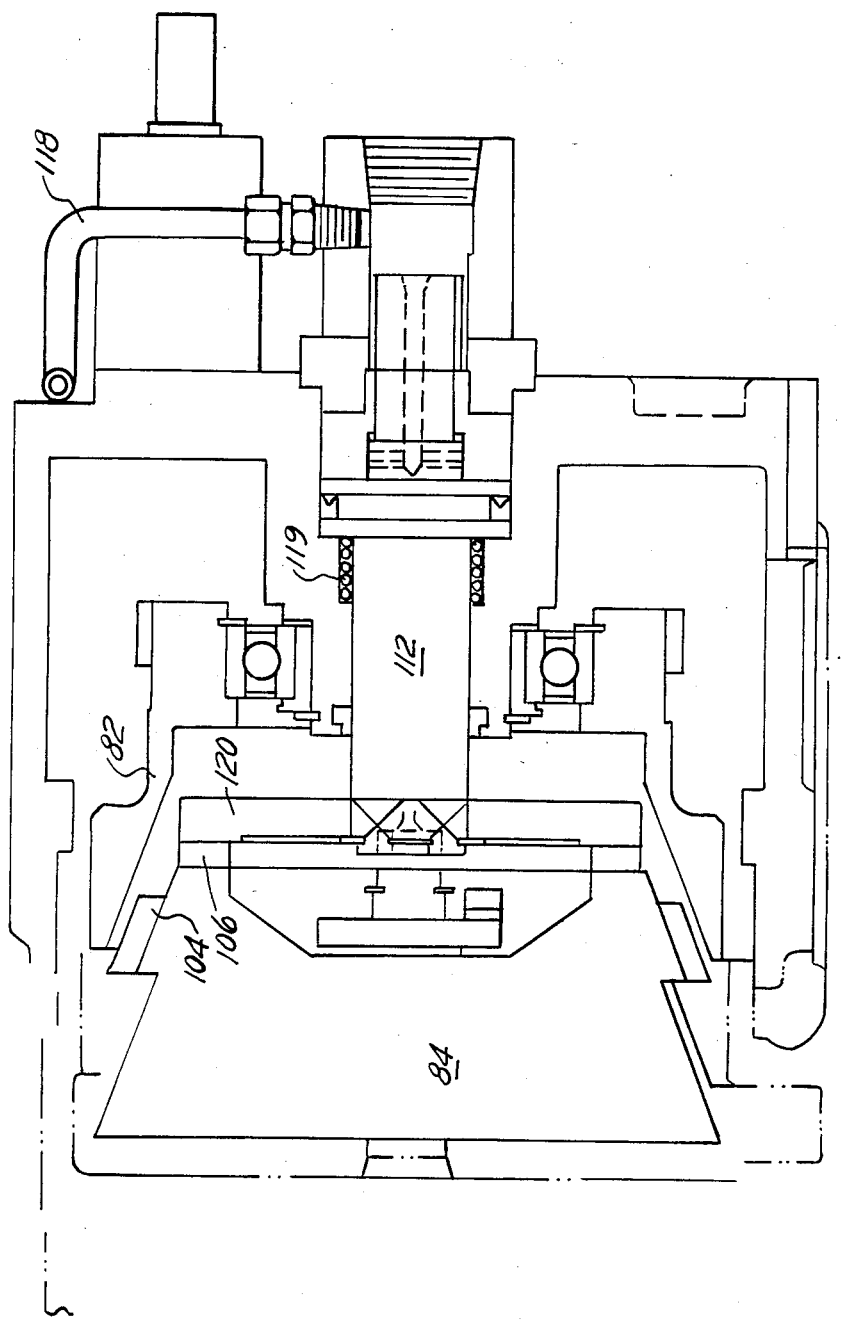

MECHANICAL QUILL HAVING SELECTIVE BRAKING CAPABILITY

CROSS-REFERENCE TO RELATED APPLICATION

This application is a continuation of application Ser. No. 174,302, filed July 31, 1980, now abandoned.

TECHNICAL FIELD

The present invention relates to quill drives or machining units for machine tools. More particularly, the present invention has particular relevance to electrically-powered, mechanically-linked two-speed quill drives.

BACKGROUND ART

U.S. Pat. No. 3,885,635 entitled "Two Speed Mechanical Quill Feed and Spindle Drive Mechanism for a Machine Tool", herein incorporated by reference and sometimes referred to as the "Mechanical Quill Patent", describes a mechanical quill drive system having many similarities to the present invention. In that patent, a quill is advanced by an external screw cooperating with a ball nut having a two speed drive. The two speed drives includes a motor driving the nut directly through gearing during rapid infeed of the quill, but which motor is itself driven through a clutch and reduction gearing by a second motor to produce the slow-speed infeed of the quill and which second motor also rotates the spindle by a driving connection with the splined drive shaft at a reduction during infeed. U.S. Pat. No. 4,000,661 is a division of U.S. Pat. No. 3,885,635.

In some applications for such quill systems, it is desirable to allow the spindle motor to run continuously, without advancing or retracting the spindle. Such spindle operation minimizes the sophistication and cost of the motor controls, but is not possible in the apparatus described in the Mechanical Quill Patent.

In order applications it is desirable to mount the quill unit with the spindle extending vertically. In such cases the mass of the quill and spindle have a tendency to cause undesirable or downward movement ("drift") of the spindle.

In some applications it is desirable to interrupt the feed stroke for chip breaking or dwelling at the completion of the stroke to assure a good finish of blind holes. The Mechanical Quill Patent cannot conveniently perform this task without substantial modification of the motor controls. Without a dwell capability, an undesirable burr is frequently created in machining.

Other feed mechanisms for quill shafts of a type used in machine tools have been in use for many, many years. While quite satisfactory hydraulic design approaches have existed in the past, current trends are for various reasons dictating a "mechanical" approach to the quill unit drive. Such mechanical drives developed to date have various drawbacks.

One such approach involves a screw actuator disposed parallel to the quill shaft which is rotated at two speeds to provide the two-speed advance of the quill shaft. An example of this design is found in U.S. Pat. No. 3,561,544. Another somewhat similar approach common also in single speed drill press type applications has involved a rack or cam drive of the quill shaft; such as shown in U.S. Pat. Nos. 2,545,008 and 2,902,891, as well as in German Pat. No. 846,807.

These approaches have the common difficulty of excessive runout of the spindle shaft since the feed forces are not aligned with the axis of the motion of the quill shaft. While some attempts to overcome this problem have been made by a power screw arrangement concentric with the quill shaft as exemplified by U.S. Pat. Nos. 2,796,767; 2,975,440; 3,430,524; and 3,139,637, these designs require bearings on a spindle shaft forward of the screw shaft and hence are quite cumbersome, and runout problems may also exist due to the long unsupported screw portion overhung at one end of the quill shaft of the mechanism, and also frictional loads may be quite high.

A concentric ball screw advancing mechanism has been described in U.S. Pat. No. 3,640,147 which would substantially alleviate the friction loads, but this design provides only a single speed feed motion and the screw portion is, similar to the above examples, overhung at one end of the quill shaft necessitating a critical bearing adjustment arrangement to control runout.

This particular means for providing a two-speed feed drive previously proposed have also not been without significant drawbacks.

A common approach seen in some of the aforementioned patents as well as U.S. Pat. No. 3,283,664 has been to provide a pair of motors driving through either a planetary or screw differential gearing. Such gearing is expensive and the controls tend to be quite complex.

Another approach is to provide a variable speed commutated motor driven at variable speed, but such motors as compared to constant speed induction motors require more maintenance (due to the brushes) and require expensive and complex electrical or electronic control systems.

Another approach is shown in U.S. Pat. No. 4,201,271 but requires costly controls.

Accordingly, it is an object of the present invention to provide a two-speed quill mechanical unit drive with a selective brake which allows mounting the quill vertically, continuous operation of the spindle motor and interrupted feed (dwell) without expensive controls.

It is another advantage of the present invention to provide a reliable two-speed drive with a minimum of gearing and controls which is capable of accurately controlling the point at which the shift to the lower speed infeed is carried out. Other objects and advantages will be apparent to those skilled in this art in view of the following description of the invention of the drawings.

SUMMARY OF THE INVENTION

The present invention is an electrically powered, mechanically coupled quill unit having a selective quill braking capability achieved by a pneumatic cylinder mounted to the motor and adapted to decouple the armature from rotation by a drive cone gear coupled to the spindle motor. The cylinder selectively disengages a clutch drive through the second motor armature by moving the armature axially away from the gear cone to decouple the drive path.

BRIEF DESCRIPTION OF THE DRAWINGS

FIG. 3 is a view of the motor braking arrangement of the present invention with the motor brake applied.

DETAILED DESCRIPTION OF THE PREFERRED EMBODIMENT

Figure 1:
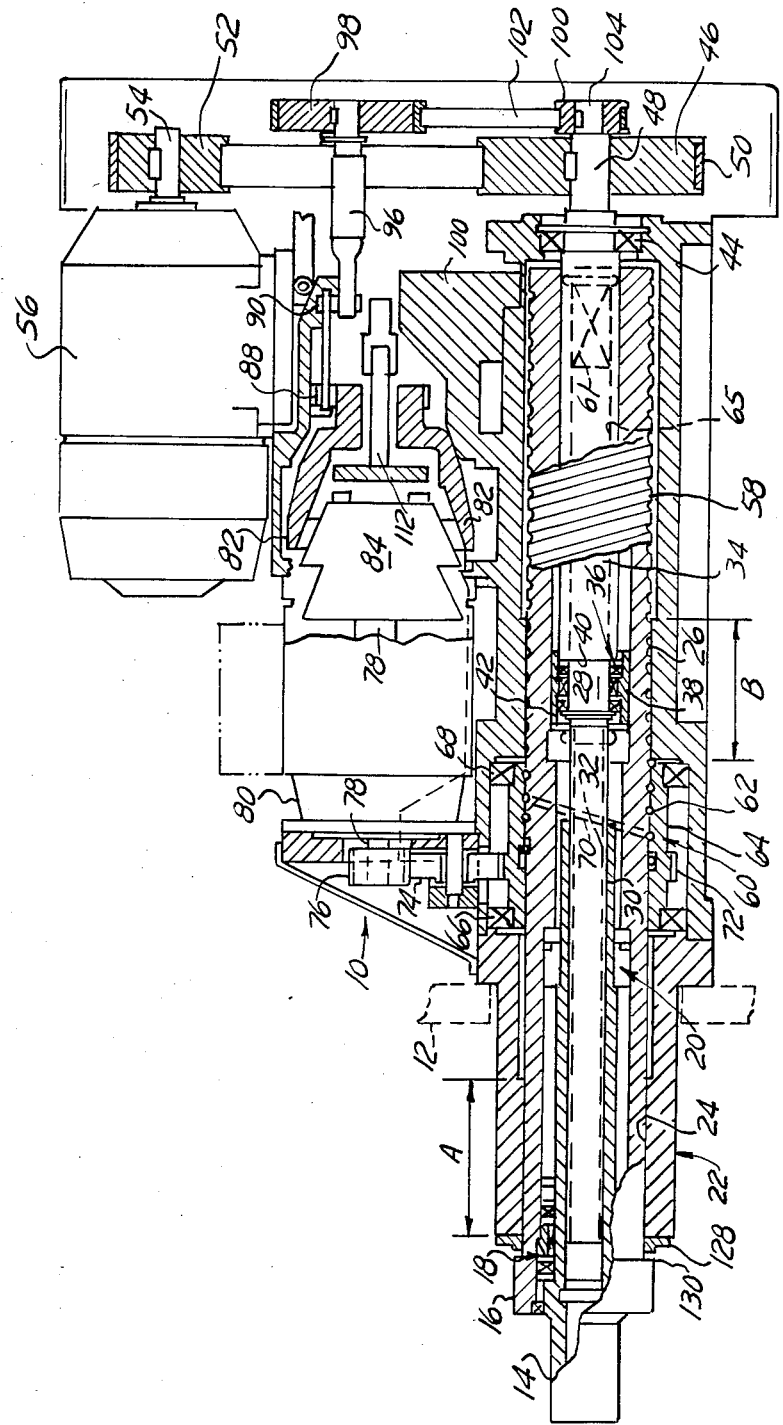
FIG. 1 is a partially sectional view of the quill unit of the present invention.

Referring to FIG. 1, a mechanical quill unit 10 is depicted in partial section taken along its longitudinal axis, which is adapted to be piloted to a mounting structure 12.

The quill unit 10 includes a hollow spindle shaft 14 to which a tool or toolholder (not shown) is to be mounted. The spindle shaft 14 is rotatably mounted within a hollow quill shaft 16 so as to be carried along together with the quill shaft 16 during linear movement thereof, radial and thrust bearing sets 18 and 20 being provided for this purpose.

The quill shaft 16 is in turn mounted in the unit housing 22 for sliding movement along its longitudinal axis by means of a slidable fit with two spaced bore surfaces 24 and 26.

The spindle shaft 14 is adapted to be rotated within the quill shaft 16 during machining operations by means of a power shaft 28 having an exteriorly splined portion 30 passing within the spindle shaft 14 and rotatively connected thereto by means of a mating interior spline 32 formed within the spindle shaft 14. It can be seen that this rotative connection will be maintained with relatively linear movement occurring during infeed as will be described herein between the power shaft 28 and the spindle shaft 14 by virtue of this splined connection.

The power shaft 28 is also formed with an extension portion 34 integral with the splined portion 30 and mounted at one end with the quill shaft 16 by means of a thrust and radial load bearing set 36 carried by a sleeve 38 slidable within the quill shaft 16. The bearing set 36 is axially fixed to the extention portion by means of engagement with a shoulder 40 and a retainer 42. The extension portion 34 is supported at the other end in the housing 22 by means of a bearing 44.

The power shaft 28 is rotated by means of a pulley wheel 46 fixed to a reduced end portion 48, the pulley wheel 46 in turn being driven by a belt 50 passing around the pulley wheel and also a smaller pulley wheel 52 affixed to the armature shaft 54 of an electric motor 56.

The quill shaft 16 is adapted to be axially advanced by cam means including a semicircular helical groove 58 formed about its outer periphery, this groove cooperating with a recirculating ball nut arrangement 60 which in turn includes a plurality of balls 62, a drive member constituted by a nut 64 rotatively supported in the housing 22 by radial thrust bearings 66 and 68 and surrounding the quill shaft 16, and ball return 70. Rotation of the nut 64 which is axially fixed by means of the bearings 66 and 68 thus causes axial advance of the quill shaft 16 in the same manner as the well known recirculating ball screw machines.

The quill shaft 16 is restrained against rotation in the housing 22 by means of a pair of keys 61, 63 carried in the exterior of the quill shaft 16 sliding in respective longitudinal slots 65, 67 formed in the housing 22. This arrangement is necessary since the drive of the nut 64 creates a rotative reaction which if not countered would result in no axial movement of the quill shaft 16.

The nut 64 is rotated in the housing 22 by means of gear teeth 72 machined into the outer portion of the nut 62, meshing with an idler gear 74 supported in the housing 22 which is in turn driven by a drive pinion 76 fixed to an output shaft 78 driven by a second electric motor 80.

The second electric motor 80 has an armature extension 84 and is of the sliding armature type such that when it is not energized to drive the pinion 76, clutch means including a drive gear cone 82 is engaged which allows driving of the motor armature extension 84 (and thus the connected armature) and connected output shaft 78 by means of a reduction gear 88,90 driven by a shaft 96 having affixed thereto a drive pulley 98 driven by a belt 102 and a drive pulley 100 affixed to a further reduced portion 104 of the shaft extension portion 34. The detail of the armature 84 and drive gear cone 82 are explained in greater detail later in connection with FIGS. 2 and 3.

Brake motors of the sliding armature type as used in electric motor 56 and 80 are of a type presently commercially available under the trade name DEMAG and hence a greatly detailed description of the same is not herein included. However, instead of the usual brake configuration in which deenergization of the motor causes braking of the armature shaft, in the particular application of electric motor 80, a clutching action is created rather than a braking action. Additionally, the motor 80 is advantageously chosen to have two braking elements, one being a frusto conical annulus mounted around the armature, the other being on the end, as better described in connection with FIGS. 2 and 3.

Figure 2:
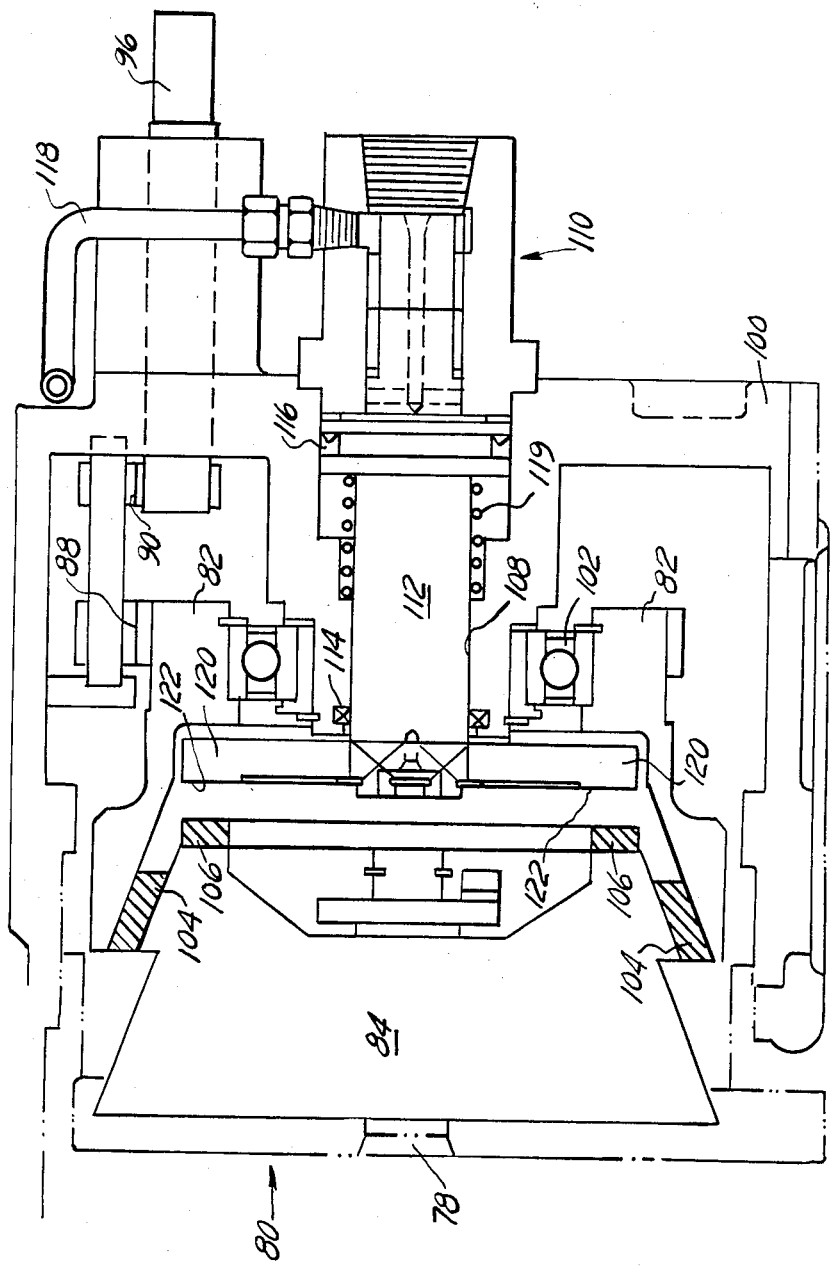
FIG. 2 is an enlarged cross sectional view of a motor braking arrangement of the present invention, before the motor brake has been applied.

FIG. 2 is an enlarged view of the second motor 80 and the drive gear cone 82. The input shaft 96 is shown to drive the drive gear cone 82 through gears 88,90, although obviously many alternate drives between the shaft 96 and the cone 82 could be proposed. The gear cone 82 is mounted to a housing member 100 (preferably a substantial iron casting) by a ball bearing mounting 102. The armature extension 84 carries a first and a second brake member 104,106. The first brake member 104 serves as a clutch and is a frusto conical annulus extending around the periphery of the armature extension 84. As shown in this view, the second motor 80 is not energized, allowing the brake member 104 to contact the drive gear cone 82 in a clutch relationship to transmit a rotation from the shaft 96 through the gear cone 82 to the armature shaft 78.

A pneumatic cylinder 110 operating a movable braking member 120 is also mounted to the housing member 100, extending through a hole 108 therethrough. The cylinder 110 includes a piston shaft 112 and carries seals 114,116. A conduit 118 transmits pressurized air in response to a signal (e.g. via a valve, not shown) to move the piston 112 and the braking member 120 forward toward the armature extension 84. A return spring 119 serves to move the piston 112 rearwardly when the pressurized air is removed.

The braking member 120 includes an annular flat surface 122 positioned to engage the second brake member 106 on the armature extension 84 when the piston 112 is moved forward. The braking member 120 is non rotatably mounted to the housing member 100 through the cylinder 110.

FIG. 3 is an enlarged view of the second motor 80 and the cylinder 110 carrying the braking member 120, with the cylinder 110 actuated by pressurized air delivered through the conduit 118. The piston 112 has moved forward, compressing the spring 119, to engage the brake 106 with the brake member 120 and move the entire armature extension 84 forwardly. The movement of the armature extension 84 disengages the clutch path between the gear cone 82 and the brake (clutch) 104.

The engagement between the armature extension 84 and the braking member 120 serves to stop the clutch drive through the gear cone 82 and to stop the rotation of the armature extension 84 since the braking member 120 and the cylinder 110 are non rotational. The brake members 104,106 are conventional friction materials adapted to stop rotation and dissipate the energy of rotation in the form of heat. Either asbestos-type or non-asbestos brake lining materials could be chosen for the brake members 104,106.

Actuation of the piston can be controlled in any of many conventional and well-known methods to generate a control signal. For example, a limit switch engaged by the displacement of the quill could be used. Any other logic element, however, could be substituted to provide a cylinder control signal to a suitable valve, all of which are well known in the art.

While a preferred embodiment of the quill of the present invention has been shown and described in some detail, many modifications and variations are possible without departing from the spirit of the present invention. For example, the pneumatic cylinder could easily be replaced by a hydraulic or electrically actuated member. The transmission shown to couple the two motors could also be interrupted to selectively brake the drive path, especially coupled with a change of the belts to gears. Accordingly, the foregoing description should be considered as merely illustrative of the principles of the present invention and not in limitation thereof, with the invention being described solely by the following claims.

Having then described the invention, what is claimed is:

1. A machining apparatus comprising:
   a housing;
   a hollow quill shaft;
   a drive member rotatably mounted in said housing surrounding said quill shaft and fixed against axial movement;
   means mounting said quill shaft in said housing for longitudinal movement along its axis;
   a spindle shaft rotatably mounted within said quill shaft and adapted to be carried by said quill shaft with said longitudinal movement;
   cam means drivingly connecting said quill shaft and said drive member producing said longitudinal movement of said quill shaft upon rotation of said drive member in said housing;
   means for rotating said drive member including a first motor, a second motor having an armature and an armature shaft connected to said armature, means drivingly connecting said second motor armature shaft and said drive member, means drivingly connecting said first motor and said spindle shaft so that said spindle shaft is rotated by said first motor, clutch means drivingly connecting said second motor armature shaft and said first motor whenever said second motor is deenergized and disconnecting said second motor armature shaft and said first motor upon energization of said second motor, said clutch means including means mounting said armature and armature shaft to be axially movable towards and away from a first position, means urging said armature and armature shaft to said first position means causing movement of said armature and armature shaft away from said first position upon energization of said second motor against said urging; and also including respective first and second clutch members drivingly connected to said first motor and said armature shaft respectively having surfaces engaged when said armature and armature shaft are in said first position, whereby said first motor is adapted to rotate said spindle shaft and is also adapted to longitudinally advance said quill shaft by driving said drive member through said second motor armature shaft when said second motor is deenergized and further including;
   means coupled to the housing for selectively decoupling the clutch surfaces drivingly connecting said second motor armature shaft and said first motor in response to a control signal, said means being operable independently of said energization of said second motor and comprising a movably mounted control member aligned opposite said second clutch member so as to move said second clutch member out of engagement with said first clutch member upon being axially shifted; and moving means for selectively axially shifting said control member into engagement with said second clutch member to move said second clutch member so as to disengage said surfaces on said first and second clutch members.

2. A machining apparatus of the type described in claim 1 wherein the moving means comprises a pneumatically actuated piston.

* * * * *